May 19, 1942.　　　T. B. DOE ET AL　　　2,283,321
POWER TRANSMISSION
Filed April 15, 1937　　　2 Sheets-Sheet 1

INVENTOR
THOMAS B. DOE &
BY　WILBERT M. GILMAN
Ralph L. Tweedale
ATTORNEY

May 19, 1942.　　T. B. DOE ET AL　　2,283,321
POWER TRANSMISSION
Filed April 15, 1937　　2 Sheets-Sheet 2
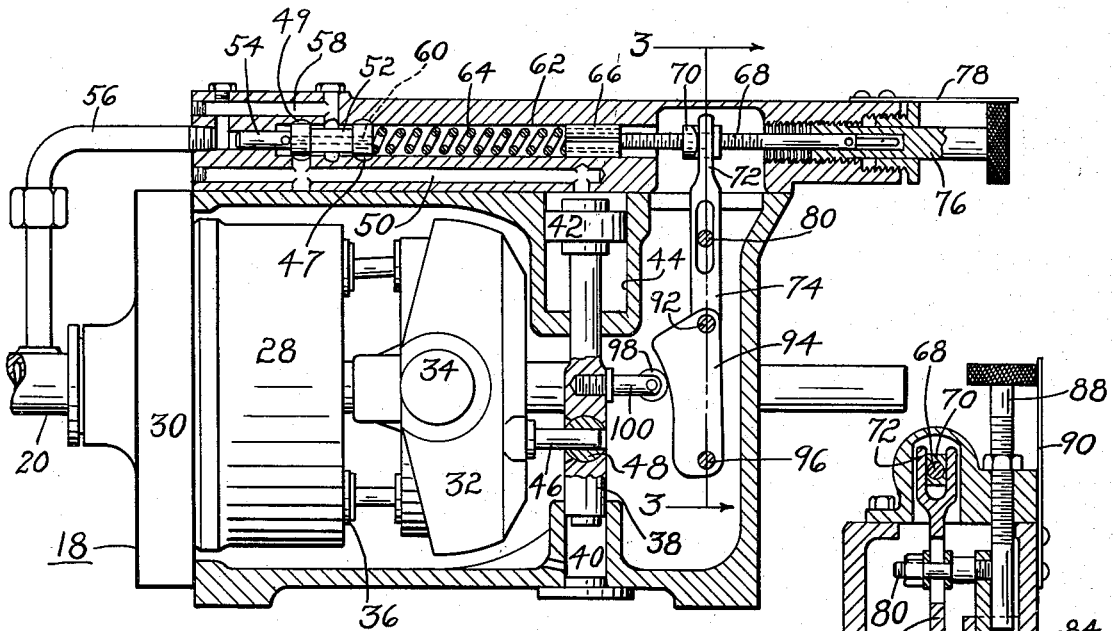
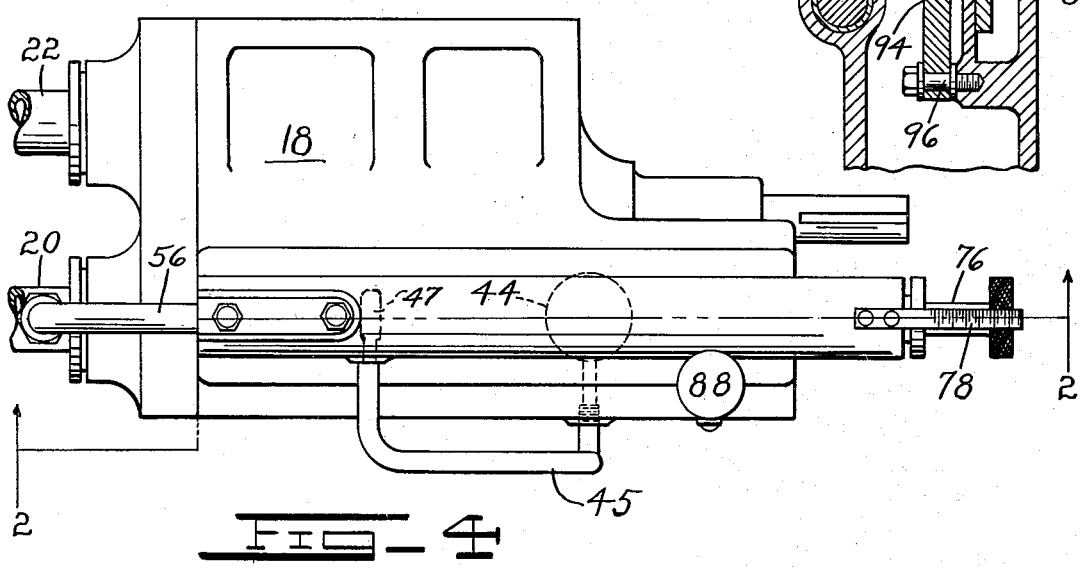
INVENTOR
THOMAS B. DOE &
BY　WILBERT M. GILMAN
ATTORNEY Patented May 19, 1942

2,283,321

UNITED STATES PATENT OFFICE 2,283,321

POWER TRANSMISSION

Thomas B. Doe, New York, N. Y., and Wilbert M. Gilman, Watertown, Conn., assignors to The Waterbury Tool Company, Waterbury, Conn., a corporation of Connecticut Application April 15, 1937, Serial No. 137,080

13 Claims. (Cl. 242—75)

This invention relates to power transmissions, particularly to transmissions of the fluid type comprising a pump unit and a fluid motor unit, at least one of which is provided with means for varying its displacement whereby the speed and torque ratios of the power transmissions may be smoothly varied. The invention is particularly adapted for use with a reeling device and has been illustrated as applied to a mechanism of this character although it will be understood that the invention is equally adaptable to other applications. In reeling devices wherein a strip of material is wound upon an arbor in successive layers, the diameter of the reeled material progressively increases as the material is wound on the reel. If the material is fed to the reel at a constant speed, the speed of the reel arbor must be decreased as the diameter of the reeled material increases, and likewise, if a constant tension is maintained on the material being reeled, a progressively increasing torque must be applied to the reel arbor as the reel diameter increases.

Heretofore in reeling devices, such for example as those used for reeling sheet metal into rolls as it comes from the processing equipment, the speed of the reel arbor has been controlled manually or automatically in accordance with the tension or lack of tension maintained in the strip material between the reel and the device which feeds the strip to the reel.

It is an object of the present invention to provide a power transmission and control therefor which will operate to maintain a constant tension on the material being reeled and maintain a constant peripheral speed on the reeled material automatically in accordance with the load on the power transmission. Power transmissions of the hydraulic type have heretofore been used for this purpose and have proven satisfactory in this service under certain conditions. One arrangement heretofore proposed utilizes a dancer roll for sensing variations in tension of the strip material being reeled, the dancer roll controlling through suitable connections the displacement regulator of a variable displacement pump. The use of a dancer roll or similar mechanism associated with the reeling machine or the strip of material is somewhat cumbersome and complicated and leaves much to be desired in the way of precise regulation of tension.

Another arrangement heretofore proposed utilizes a fixed displacement pump and a variable displacement motor driving the reel, together with an automatic pressure responsive regulator to control the displacement of the motor in a manner to maintain a constant fluid pressure in the transmission system. This type of control, while being simple and accurate, is somewhat limited in its application due to the comparatively narrow range of speeds over which it is operable. It is inherent in a variable displacement fluid motor that the maximum speed is in the neighborhood of only four or five times the minimum speed and the speed variation is a hyperbolic function of the displacement. A system of this character is therefore necessarily limited to a reeling operation wherein the maximum reel diameter is not over four or five times the diameter of the arbor upon which the material is reeled.

It is a further object of the present invention to provide a variable speed power transmission and control therefor which will operate to maintain constant tension upon the material being reeled and which is operable over any desired range of speeds and reel diameters and which avoids the use of mechanism in contact with or associated with the reel or the strip material to determine the tension.

A further object is to provide a fluid power transmission with automatic control means for maintaining a constant output horsepower and which is responsive directly to the pressure developed in the transmission fluid.

Further objects and advantages of the present invention will be apparent from the following description, reference being had to the accompanying drawings wherein a preferred form of the present invention is clearly shown.

In the drawings:

Fig. 2 is a longitudinal cross section on line 2—2 of Fig. 4 showing the control mechanism for the variable displacement pump.

Fig. 3 is a fragmentary cross section on line 3—3 of Fig. 2.

Fig. 4 is a top view of a variable displacement pump and control mechanism forming part of the present invention.

Figure 1:
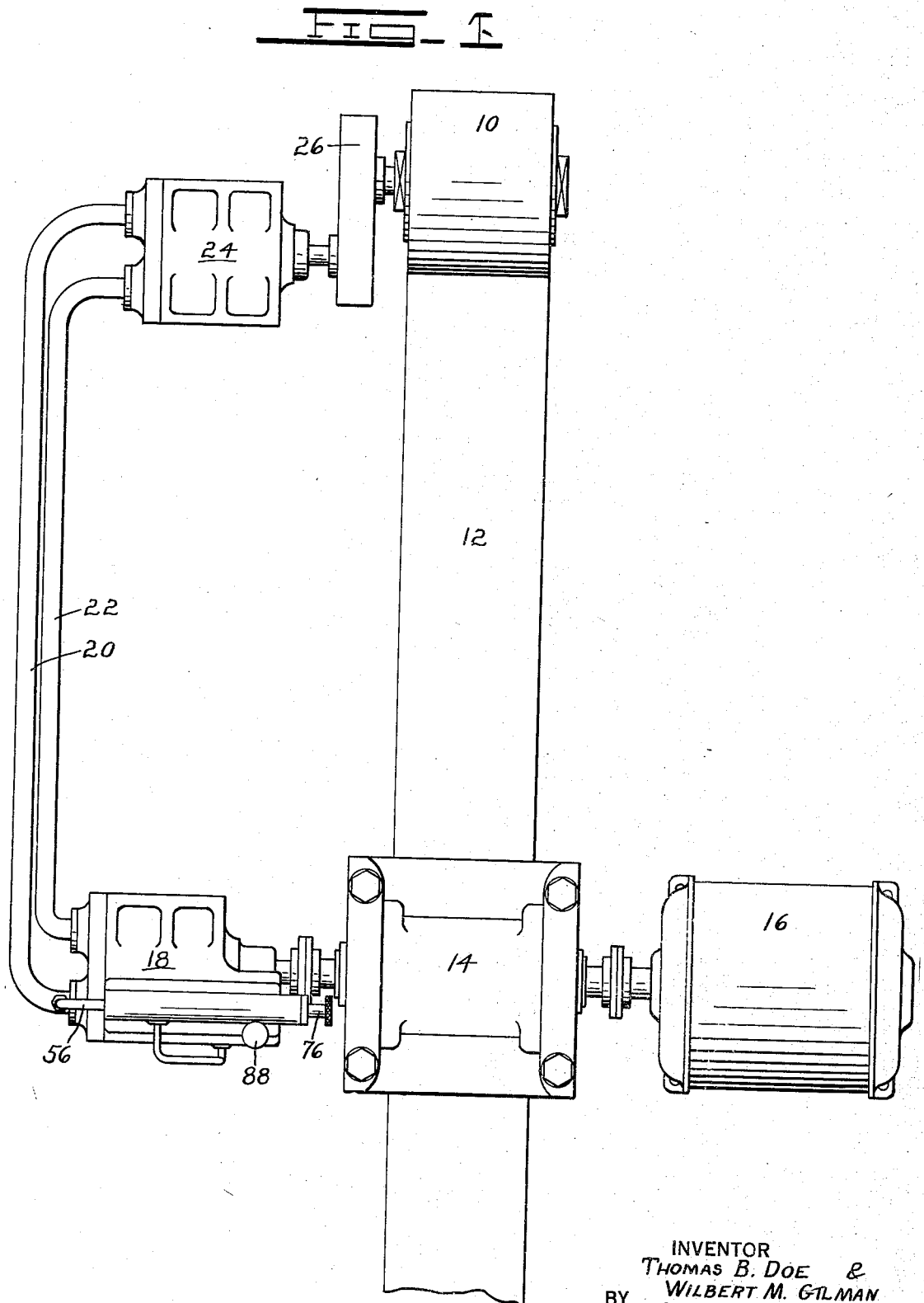
Fig. 1 is a plan view of a power transmission and reeling device embodying a preferred form of the present invention.

In the form of the invention illustrated in Fig. 1 a reel 10 is provided for winding strip material 12 on the arbor thereof. The strip material is fed to the reel from a feeding device such as a finishing roll stand 14. The feeding device is driven by a suitable prime mover, for example a variable speed electric motor 16. The motor 16 also drives a fluid pump 18 which is of variable displacement and is illustrated as of the well-known "Waterbury" type. The pump 18 is connected by means of supply and return conduits 20 and 22 with a fixed displacement motor 24. The motor 24 drives the reel 10 through a reduction gear 26. The motor 24 is illustrated as also of the well-known "Waterbury" type.

Referring now to Figs. 2, 3, and 4, the construction of the variable displacement pump 18 and the control mechanism therefor is there illustrated. The pump itself is of well-known construction comprising a revolving cylinder barrel 28 abutting against a valve plate 30 into which the conduits 20 and 22 are connected. A tilting box 32 is adjustable on trunnions 34 to determine the stroke of pistons 36 and thus control the displacement of the pump 18. For the purpose of regulating the position of the tilting box, a sliding control stem 38 is mounted to slide in a guide bearing 40 and carries a piston 42 slidable in a cylinder 44. The stem 38 is connected to the tilting box by a stud 46 and a pivoting and sliding connection at 48. The lower end of the cylinder 44 is connected by a conduit 45 to a groove 47 formed in a bore 62. The upper end of the cylinder 44 is connected by a conduit 50 to a groove 49 in the bore 62. The grooves 47 and 49 are covered and uncovered by a pilot valve 52 for the purpose of selectively connecting the opposite ends of the cylinder 44 to the delivery pressure and to exhaust whereby the position of the piston 42 may be controlled.

The pivot valve 52 carries a piston 54 subject on its left-hand end to the delivery pressure in conduit 20 transmitted thereto through a branch conduit 56. A conduit 58 supplies fluid at delivery pressure to the space between the two piston heads of the valve 52. The space at the outer ends of the two piston heads is connected to the interior of the casing of the pump 18 through a central bore 60 in the valve 52 and through the large bore 62 in which the valve 52 is mounted. The valve 52 is subject on its right-hand end to the force of a spring 64, the loading of which is controlled by a movable abutment 66 having longitudinal bores for passage of oil from the bore 62 to the interior of the casing. The abutment 66 is carried on a screw-threaded stem 68 which carries a nut 70 engaging the bifurcated end 72 of a lever 74. The right-hand end of the stem 68 is slidably but non-rotatably engaged with an adjusting screw 76 which may be turned to thread the stem 68 into or out of the nut 70. In turning, the adjusting screw 76 also moves in or out so that the adjustment of the screw 76 may be determined by a suitable scale 78.

The lever 74 is carried on an adjustable fulcrum comprising a pin 80 mounted on a sliding plate 82 (see Fig. 3). The plate 82 has a projecting flange 84 which is engaged in a groove 86 on an adjusting screw 88, the latter cooperating with a scale 90 in a manner similar to that of the screw 76 and scale 78. The lever 74 is pivoted at 92 to a cam 94 pivoted to the casing at 96. Cam 94 cooperates with a roller 98 carried on a stud 100 secured to the stem 38.

In operation the strip material 12 having its end secured to the arbor of reel 10, the motor 16 is started driving the roll stand 14 and driving the reel 10 through the transmission 18—24. Before the reel starts, the valve 52 is shifted to the left of the position illustrated in Fig. 2 by the spring 64, thus admitting fluid from the conduit 20 through conduits 56, 58 and 50 to the upper face of the piston 42 and connecting the bottom of cylinder 44 to exhaust. The first fluid that is pumped thus moves the piston 42 downwardly until the displacement of the pump 18 is sufficiently great to drive the reel at maximum speed or at least at the speed necessary to maintain the desired predetermined tension in the strip 12. As this tension is reached, the pressure in the delivery conduit 20 builds up due to the resisting torque on the reel 10 imposed by the tension of the strip 12. The pressure developed under these conditions is sufficient to overcome the force of the spring 64 and move the valve 52 to closed position as illustrated in Fig. 2. As the diameter of the material on the reel increases, the torque on the reel 10 must be increased if the tension on the strip 12 is to be maintained constant. Likewise, the speed of the reel 10 must be decreased proportionally to the increase in the reel diameter. With the gradually increasing reel diameter, the pressure in conduit 20 tends to rise thus forcing the valve 52 to the right and exhausting fluid from the upper end of the cylinder 44 through the conduit 50 and conduits 60 and 62. This decreases the displacement of the pump 18 and thus slows down the reel to the speed required.

In order to maintain the tension substantially constant, it is necessary that the relation between the pressure in the conduit 20 and the displacement of the pump 18 be such that their product is constant; that is, a hyperbolic relationship. This requirement is met by the cam 94 and its connections to the spring abutment 66 which vary the loading of the spring 64 in a manner to produce this relationship between pressure and displacement. For this purpose the shape of the cam 94 and the characteristic of the spring 64 are so correlated that the valve 52 is in equilibrium only when the product of the pressure in the conduit 20 and the displacement of the pump 18 is a predetermined value. Thus, as the reel diameter increases, the pressure necessary to move the valve 52 to the right of the closed position increases as the tilting box 32 moves toward neutral position so that as the speed of the reel decreases the working pressure in conduit 20 increases.

Since the motor 24 is of fixed displacement, the torque on the reel 10 is in linear proportion to the working pressure in conduit 20. Since this pressure varies hyperbolically with the displacement of the pump 18, and since the speed of the motor 24 is in linear proportion to the displacement of the pump 18, it follows that the relation between the speed of the reel 10 and the torque thereof is likewise a hyperbolic function. It will thus be seen that the horsepower transmitted through transmission 18—24 is maintained constant and the tension on the strip 12 is likewise maintained constant.

For reeling material of different thicknesses and widths it is desirable to be able to adjust the value of the constant tension which is maintained in the strip 12. For this purpose the initial preloading of the spring 64 may be adjusted by the adjusting screw 76 which serves to give an additive adjustment to the spring. The mechanical advantage of the cam 94 over the spring 64 is variable by the adjusting screw 88. This provides a multiplying or factorial adjustment of the spring 64.

While the form of embodiment of the invention as herein disclosed, constitutes a preferred form, it is to be understood that other forms might be adopted, all coming within the scope of the claims which follow.

What is claimed is as follows:

1. A device for reeling strip material comprising in combination a reel, driving means for the reel including a variable displacement fluid pump and a fixed displacement fluid motor driven by the pump and control means for maintaining a constant peripheral tension in the material being reeled, including means responsive to fluid pressure between the pump and motor for controlling the displacement of the pump in a manner to keep the product of pressure and displacement substantially constant.

2. A device for reeling strip material comprising in combination a reel, driving means for the reel including a variable displacement fluid pump and a fixed displacement fluid motor driven by the pump and control means for maintaining a constant peripheral tension in the material being reeled, including means mechanically independent of the reel and strip material for controlling the displacement of the pump in a manner to keep the product of pressure and displacement substantially constant.

3. A device for reeling strip material comprising in combination a reel, feeding means for the reel, a variable displacement fluid pump driven at a speed, the ratio of which is constant with respect to the speed of the feeding means, a fixed displacement fluid motor driven by the pump and connected to drive the reel, and control means for maintaining a constant tension on the material between the reel and the feeding means, including means responsive to fluid pressure between the pump and motor for controlling the displacement of the pump to maintain a substantially constant product of pressure and displacement.

4. A device for reeling strip material comprising in combination a reel, driving means for the reel including a variable displacement fluid pump and a fixed displacement fluid motor driven by the pump and control means for maintaining a constant peripheral tension in the material being reeled, including means responsive to fluid pressure between the pump and motor for controlling the displacement of the pump in a manner to keep the product of pressure and displacement substantially constant, and means for adjusting said last means to vary said product.

5. A device for reeling strip material comprising in combination a reel, driving means for the reel including a variable displacement fluid pump and a fixed displacement fluid motor driven by the pump and control means for maintaining a constant peripheral tension in the material being reeled, including means responsive to fluid pressure between the pump and motor for controlling the displacement of the pump in a manner to keep the product of pressure and displacement substantially constant, and means for adjusting said last means to vary said product, said adjusting means including separate mechanisms for varying said product both additively and factorially.

6. In a fluid power transmission system the combination of a load device, a prime mover, a variable displacement fluid pump driven by the prime mover, a fluid motor driven by the pump and driving the load device, and control means for maintaining a constant horsepower output to the load device, said control means including an element for controlling the pump displacement and subjected to the fluid pressure in the transmission, resilient means acting on said element in opposition to the fluid pressure, and means for varying the effect of the resilient means in response to changes in pump displacement.

7. In a fluid power transmission system the combination of a load device, a prime mover, a variable displacement fluid pump driven by the prime mover, a fluid motor driven by the pump and driving the load device, control means for maintaining a constant horsepower output to the load device, said control means including an element for controlling the pump displacement and subjected to the fluid pressure in the transmission, resilient means acting on said element in opposition to the fluid pressure, means for varying the effect of the resilient means in response to changes in pump displacement, and adjusting means for adjusting the magnitude of the variation produced by the last mentioned means.

8. In a fluid power transmission system the combination of a load device, a prime mover, a variable displacement fluid pump driven by the prime mover, a fluid motor driven by the pump and driving the load device, control means for maintaining a constant horsepower output to the load device, said control means including an element for controlling the pump displacement and subjected to the fluid pressure in the transmission, resilient means acting on said element in opposition to the fluid pressure, means for varying the effect of the resilient means in response to changes in pump displacement, and adjusting means including a lever having an adjustable fulcrum for adjusting the magnitude of the variation produced by the last mentioned means.

9. In a fluid power transmission system the combination of a load device, a prime mover, a variable displacement fluid pump driven by the prime mover, a fluid motor driven by the pump and driving the load device, control means for maintaining a constant horsepower output to the load device, said control means including an element for controlling the pump displacement and subjected to the fluid pressure in the transmission, resilient means acting on said element in opposition to the fluid pressure, means for varying the effect of the resilient means in response to changes in pump displacement, and means for varying the initial loading of said resilient means.

10. In a fluid power transmission system the combination of a load device, a prime mover, a variable displacement fluid pump driven by the prime mover, a fluid motor driven by the pump and driving the load device, control means for maintaining a constant horsepower output to the load device, said control means including an element for controlling the pump displacement and subjected to the fluid pressure in the transmission, resilient means acting on said element in opposition to the fluid pressure, means for varying the effect of the resilient means in response to changes in the pump displacement, adjusting means for adjusting the magnitude of the variation produced by the last mentioned means, and means for varying the initial loading of said resilient means.

11. A device for reeling strip material comprising in combination a reel, driving means for the reel including a variable displacement fluid pump and a fixed displacement fluid motor driven by the pump and control means for maintaining a constant peripheral tension in the material being reeled, including means responsive to fluid pressure between the pump and motor for controlling the displacement of the pump in a manner to keep the product of pressure and rate of fluid flow to the motor substantially constant.

12. A device for reeling strip material comprising in combination a reel, driving means for the reel including a variable displacement fluid pump and a fixed displacement fluid motor driven by the pump and control means for maintaining a constant peripheral tension in the material being reeled, including means mechanically independent of the reel and strip material for controlling the displacement of the pump in a manner to keep the product of pressure and rate of fluid flow to the motor substantially constant.

13. A device for reeling strip material comprising in combination a reel, feeding means for the reel, a variable displacement fluid pump driven at a speed, the ratio of which is constant with respect to the speed of the feeding means, a fixed displacement fluid motor driven by the pump and connected to drive the reel, and control means for maintaining a constant tension on the material between the reel and the feeding means, including means responsive to fluid pressure between the pump and motor for controlling the displacement of the pump in a manner to keep the product of pressure and rate of fluid flow to the motor substantially constant.

THOMAS B. DOE.
WILBERT M. GILMAN.